US012602790B2

(12) United States Patent
Zhou et al.

(10) Patent No.: US 12,602,790 B2
(45) Date of Patent: Apr. 14, 2026

(54) MACHINE-LEARNING MODELS FOR DISTRACTOR SEGMENTATION WITH REDUCED USER INTERACTIONS

(71) Applicant: Adobe Inc., San Jose, CA (US)

(72) Inventors: Yuqian Zhou, Urbana, IL (US);
Chuong Huynh, Hyattsville, MD (US);
Connelly Barnes, Seattle, WA (US);
Elya Shechtman, Seattle, WA (US);
Sohrab Amirghodsi, Seattle, WA (US);
Zhe Lin, Fremont, CA (US)

(73) Assignee: Adobe Inc., San Jose, CA (US)

( * ) Notice: Subject to any disclaimer, the term of this patent is extended or adjusted under 35 U.S.C. 154(b) by 398 days.

(21) Appl. No.: 18/307,353

(22) Filed: Apr. 26, 2023

(65) Prior Publication Data

US 2024/0362791 A1    Oct. 31, 2024

(51) Int. Cl.
*G06T 7/12*        (2017.01)
*G06F 3/04883*    (2022.01)
(Continued)

(52) U.S. Cl.
CPC ............ *G06T 7/12* (2017.01); *G06F 3/04883* (2013.01); *G06V 10/44* (2022.01); *G06V 10/761* (2022.01);
(Continued)

(58) Field of Classification Search
CPC ....... G06F 3/04883; G06T 2207/20081; G06T 2207/20084; G06T 2207/20101;
(Continued)

(56) References Cited

U.S. PATENT DOCUMENTS

2017/0311839 A1*  11/2017  Osman ................. A61B 5/1107
2021/0279503 A1*   9/2021  Qi ....................... G06F 18/2413
(Continued)

OTHER PUBLICATIONS

Agrim Gupta, Piotr Dollar, and Ross Girshick. Lvis: A dataset for large vocabulary instance segmentation. In Proceedings of the IEEE/CVF conference on computer vision and pattern recognition, pp. 5356-5364, 2019.
(Continued)

*Primary Examiner* — Manuchehr Rahmjoo
(74) *Attorney, Agent, or Firm* — Keller Preece PLLC

(57) ABSTRACT

The present disclosure relates to systems, non-transitory computer-readable media, and methods for utilizing machine learning to generate a mask for an object portrayed in a digital image. For example, in some embodiments, the disclosed systems utilize a neural network to generate an image feature representation from the digital image. The disclosed systems can receive a selection input identifying one or more pixels corresponding to the object. In addition, in some implementations, the disclosed systems generate a modified feature representation by integrating the selection input into the image feature representation. Moreover, in one or more embodiments, the disclosed systems utilize an additional neural network to generate a plurality of masking proposals for the object from the modified feature representation. Furthermore, in some embodiments, the disclosed systems utilize a further neural network to generate the mask for the object from the modified feature representation and/or the masking proposals.

20 Claims, 9 Drawing Sheets

800

Generating, Utilizing A Feature Extraction Model, An Image Feature Representation From A Digital Image 802

Receiving A Selection Input Identifying A Pixel Corresponding To An Object Portrayed In The Digital Image 804

Generating A Modified Feature Representation By Integrating The Selection Input Into The Image Feature Representation 806

Generating, Utilizing A Machine-Learning Mask Model, A Mask For The Object Portrayed In The Digital Image From The Modified Feature Representation 808

(51) Int. Cl.
G06V 10/44 (2022.01)
G06V 10/74 (2022.01)
G06V 10/80 (2022.01)
(52) U.S. Cl.
CPC .. G06V 10/806 (2022.01); G06T 2207/20101 (2013.01); G06V 2201/07 (2022.01)
(58) Field of Classification Search
CPC .. G06T 7/11; G06T 7/12; G06V 10/44; G06V 10/761; G06V 10/806; G06V 2201/07
See application file for complete search history.

(56) References Cited

U.S. PATENT DOCUMENTS

| | | | | |
|---|---|---|---|---|
| 2023/0099947 A1 * | 3/2023 | Machek | ............... | G06F 18/214 |
| | | | | 382/128 |
| 2024/0013033 A1 * | 1/2024 | Yang | ......................... | G03F 1/36 |
| 2025/0029240 A1 * | 1/2025 | Kushnarev | ............... | G06T 7/12 |

OTHER PUBLICATIONS

Alexey Dosovitskiy, Lucas Beyer, Alexander Kolesnikov, Dirk Weissenborn, Xiaohua Zhai, Thomas Unterthiner, Mostafa Dehghani, Matthias Minderer, Georg Heigold, Sylvain Gelly, et al. An image is worth 16×16 words: Transformers for image recognition at scale. arXiv preprint arXiv:2010.11929, 2020.
Ashish Vaswani, Noam Shazeer, Niki Parmar, Jakob Uszkoreit, Llion Jones, Aidan N Gomez, Łukasz Kaiser, and Illia Polosukhin. Attention is all you need. Advances in neural information processing systems, 30, 2017.
Bolei Zhou, Hang Zhao, Xavier Puig, Sanja Fidler, Adela Barriuso, and Antonio Torralba. Scene parsing through ade20k dataset. In Proceedings of the IEEE conference on computer vision and pattern recognition, pp. 633-641, 2017.
Bowen Cheng, Ishan Misra, Alexander G Schwing, Alexan-der Kirillov, and Rohit Girdhar. Masked-attention mask transformer for universal image segmentation. In Proceedings of the IEEE/CVF Conference on Computer Vision and Pattern Recognition, pp. 1290-1299, 2022.
Christof Koch and Shimon Ullman. Shifts in selective visual attention: towards the underlying neural circuitry. In Matters of intelligence, pp. 115-141. Springer, 1987.
Enze Xie, Wenhai Wang, Zhiding Yu, Anima Anandkumar, Jose M Alvarez, and Ping Luo. Segformer: Simple and efficient design for semantic segmentation with transformers. Advances in Neural Information Processing Systems, 34:12077-12090, 2021.
Golnaz Ghiasi, Yin Cui, Aravind Srinivas, Rui Qian, Tsung- Yi Lin, Ekin D Cubuk, Quoc V Le, and Barret Zoph. Simple copy-paste is a strong data augmentation method for instance segmentation. In Proceedings of the IEEE/CVF Conference on Computer Vision and Pattern Recognition, pp. 2918-2928, 2021.
Jiahui Yu, Zhe Lin, Jimei Yang, Xiaohui Shen, Xin Lu, and Thomas S Huang. Generative image inpainting with contextual attention. In Proceedings of the IEEE conference on computer vision and pattern recognition, pp. 5505-5514, 2018.
Kaiming He, Georgia Gkioxari, Piotr Dollár, and Ross Girshick. Mask r-cnn. In Proceedings of the IEEE international conference on computer vision, pp. 2961-2969, 2017.
Kaiming He, Xiangyu Zhang, Shaoqing Ren, and Jian Sun. Deep residual learning for image recognition. In Proceed-ings of the IEEE conference on computer vision and pattern recognition, pp. 770-778, 2016.
Kfir Aberman, Junfeng He, Yossi Gandelsman, Inbar Mosseri, David E Jacobs, Kai Kohlhoff, Yael Pritch, and Michael Rubinstein. Deep saliency prior for reducing visual distraction. In Proceedings of the IEEE/CVF Conference on Computer Vision and Pattern Recognition, pp. 19851-19860, 2022.
Konstantin Sofiiuk, Ilia Petrov, Olga Barinova, and Anton Konushin. f-brs: Rethinking backpropagating refinement for interactive segmentation. In Proceedings of the IEEE/CVF Conference on Computer Vision and Pattern Recognition, pp. 8623-8632, 2020.
Konstantin Sofiiuk, Ilya A Petrov, and Anton Konushin. Reviving iterative training with mask guidance for interactive segmentation. In 2022 IEEE International Conference on Image Processing (ICIP), pp. 3141-3145. IEEE, 2022.
Laurent Itti and Christof Koch. Computational modelling of visual attention. Nature reviews neuroscience, 2(3):194-203, 2001.
Lu Qi, Jason Kuen, Yi Wang, Jiuxiang Gu, Hengshuang Zhao, Zhe Lin, Philip Torr, and Jiaya Jia. Open-world entity segmentation. arXiv preprint arXiv:2107.14228, 2021.
Luca Ciampi. Deep learning techniques for visual counting. arXiv preprint arXiv:2206.03033, 2022.
Marco Forte, Brian Price, Scott Cohen, Ning Xu, and Franç ois Pitié. Getting to 99% accuracy in interactive segmentation. arXiv preprint arXiv:2003.07932, 2020.
Marius Cordts, Mohamed Omran, Sebastian Ramos, Timo Scharwächter, Markus Enzweiler, Rodrigo Benenson, Uwe Franke, Stefan Roth, and Bernt Schiele. The cityscapes dataset. In CVPR Workshop on the Future of Datasets in Vision, vol. 2. sn, 2015.
Matthias Kummerer, Lucas Theis, and Matthias Bethge. Deep gaze i: Boosting saliency prediction with feature maps trained on imagenet. arXiv preprint arXiv:1411.1045, 2014.
Matthias Kummerer, Thomas SA Wallis, Leon A Gatys, and Matthias Bethge. Understanding low- and high-level contributions to fixation prediction. In Proceedings of the IEEE international conference on computer vision, pp. 4789-4938 4798, 2017.
Min Shi, Hao Lu, Chen Feng, Chengxin Liu, and Zhiguo Cao. Represent, compare, and learn: A similarity-aware framework for class-agnostic counting. In Proceedings of the IEEE/CVF Conference on Computer Vision and Pattern Recognition, pp. 9529-9538, 2022.
Ning Xu, Brian Price, Scott Cohen, Jimei Yang, and Thomas S Huang. Deep interactive object selection. In Proceedings of the IEEE conference on computer vision and pat-tern recognition, pp. 373-381, 2016.
Ohad Fried, Eli Shechtman, Dan B Goldman, and Adam Finkelstein. Finding distractors in images. In Proceedings of the IEEE Conference on Computer Vision and pattern Recognition, pp. 1703-1712, 2015.
Patrick Esser, Robin Rombach, and Bjorn Ommer. Taming trans-formers for high-resolution image synthesis. In Proceedings of the IEEE/CVF conference on computer vision and pattern recognition, pp. 12873-12883, 2021.
Peter Shaw, Jakob Uszkoreit, and Ashish Vaswani. Self attention with relative position representations. arXiv preprint arXiv:1803. 02155, 2018.
Raia Hadsell, Sumit Chopra, and Yann LeCun. Dimensionality reduction by learning an invariant mapping. In 2006 IEEE Computer Society Conference on Computer Vision and Pat-tern Recognition (CVPR'06), vol. 2, pp. 1735-1742. IEEE, 2006.
Sen Jia and Neil DB Bruce. Eml-net: An expandable multi-layer network for saliency prediction. Image and vision computing, 95:103887, 2020.
Tao Wang, Kaihao Zhang, Xuanxi Chen, Wenhan Luo, Jiankang Deng, Tong Lu, Xiaochun Cao, Wei Liu, Hong-dong Li, and Stefanos Zafeiriou. A survey of deep face restoration: Denoise, super-resolution, deblur, artifact removal. arXiv preprint arXiv:2211. 02831, 2022.
Tsung-Yi Lin, Michael Maire, Serge Belongie, James Hays, Pietro Perona, Deva Ramanan, Piotr Dolla'r, and C Lawrence Zitnick. Microsoft coco: Common objects in context. In European conference on computer vision, pp. 740-755. Springer, 2014.
Viresh Ranjan and Minh Hoai. Exemplar free class agnostic counting. arXiv preprint arXiv:2205.14212, 2022.
Weibo Shu, Jia Wan, Kay Chen Tan, Sam Kwong, and An-toni B Chan. Crowd counting in the frequency domain. In Proceedings of the IEEE/CVF Conference on Computer Vision and Pattern Recognition, pp. 19618-19627, 2022.
Wenhai Wang, Enze Xie, Xiang Li, Deng-Ping Fan, Kaitao Song, Ding Liang, Tong Lu, Ping Luo, and Ling Shao. Pyramid vision transformer: A versatile backbone for dense prediction without

(56)          References Cited

OTHER PUBLICATIONS convolutions. In Proceedings of the IEEE/CVF International Conference on Computer Vision, pp. 568-578, 2021.

Won-Dong Jang and Chang-Su Kim. Interactive image segmentation via backpropagating refinement scheme. In Proceedings of the IEEE/CVF Conference on Computer Vision and Pattern Recognition, pp. 5297-5306, 2019.

Xi Chen, Zhiyan Zhao, Feiwu Yu, Yilei Zhang, and Manni Duan. Conditional diffusion for interactive segmentation. In Proceedings of the IEEE/CVF International Conference on Computer Vision, pp. 7345-7354, 2021.

Xi Chen, Zhiyan Zhao, Yilei Zhang, Manni Duan, Donglian Qi, and Hengshuang Zhao. Focalclick: Towards practical interactive image segmentation. In Proceedings of the IEEE/CVF Conference on Computer Vision and Pattern Recognition, pp. 1300-1309, 2022.

Xiaolin Zhang, Yunchao Wei, Yi Yang, and Thomas S Huang. Sg-one: Similarity guidance network for one-shot semantic segmentation. IEEE transactions on cybernetics, 50(9):3855-3865, 2020.

Xiaolong Wang, Ross Girshick, Abhinav Gupta, and Kaiming He. Non-local neural networks. In Proceedings of the IEEE conference on computer vision and pattern recogni-tion, pp. 7794-7803, 2018.

Xingyi Zhou, Dequan Wang, and Philipp Krähenbühl. Objects as points. arXiv preprint arXiv:1904.07850, 2019.

Xizhou Zhu, Weijie Su, Lewei Lu, Bin Li, Xiaogang Wang, and Jifeng Dai. Deformable detr: Deformable transformers for end-to-end object detection. arXiv:2010.04159, 2020.

Yanwei Li, Hengshuang Zhao, Xiaojuan Qi, Liwei Wang, Zeming Li, Jian Sun, and Jiaya Jia. Fully convolutional networks for panoptic segmentation. In Proceedings of the IEEE/CVF conference on computer vision and pattern recognition, pp. 214-223, 2021.

Mqun Mei, Yuchen Fan, Yuqian Zhou, Lichao Huang, Thomas S Huang, and Honghui Shi. Image super-resolution with cross-scale non-local attention and exhaustive self exemplars mining. In Proceedings of the IEEE/CVF conference on computer vision and pattern recognition, pp. 962 5690-5699, 2020.

Ze Liu, Yutong Lin, Yue Cao, Han Hu, Yixuan Wei, Zheng Zhang, Stephen Lin, and Baining Guo. Swin transformer: Hierarchical vision transformer using shifted windows. In Proceedings of the IEEE/CVF International Conference on Computer Vision, pp. 10012-10022, 2021.

Zheng Lin, Zhao Zhang, Lin-Zhuo Chen, Ming-Ming Cheng, and Shao-Ping Lu. Interactive image segmentation with first click attention. In Proceedings of the IEEE/CVF conference on computer vision and pattern recognition, pp. 13339-13348, 2020.

Zhi Tian, Chunhua Shen, Hao Chen, and Tong He. Fcos: Fully convolutional one-stage object detection. In Proceedings of the IEEE/CVF international conference on computer vision, pp. 9627-9636, 2019.

Ziyu Wan, Bo Zhang, Dongdong Chen, Pan Zhang, Dong Chen, Jing Liao, and Fang Wen. Bringing old photos back to life. In proceedings of the IEEE/CVF conference on computer vision and pattern recognition, pp. 2747-2757, 2020.

* cited by examiner

Figure 3:
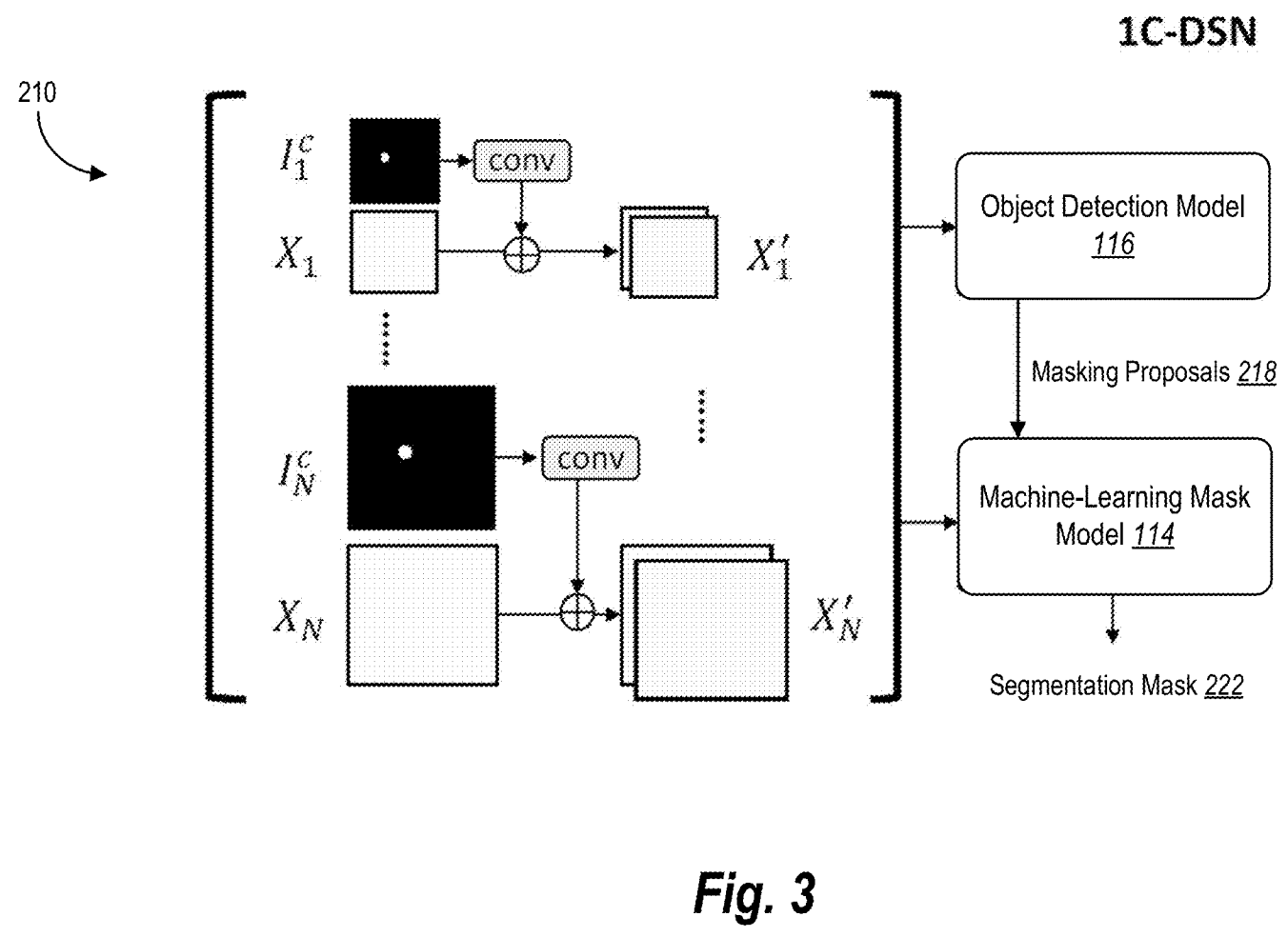

1C-DSN

Object Detection Model 116

Masking Proposals 218

Machine-Learning Mask Model 114

Segmentation Mask 222

$X'_1$ $X'_N$ conv conv $I^c_1$ $X_1$ $I^c_N$ $X_N$

Computing Device(s) *700*

Image Editing System *104*

Distractor Segmentation System *102*

Feature Representation Generator *702*

Selection Input Manager *704*

Masking Proposal Generator *706*

Mask Generator *708*

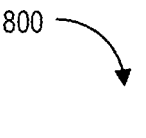

800

Generating, Utilizing A Feature Extraction Model, An Image Feature Representation From A Digital Image _802_

Receiving A Selection Input Identifying A Pixel Corresponding To An Object Portrayed In The Digital Image _804_

Generating A Modified Feature Representation By Integrating The Selection Input Into The Image Feature Representation _806_

Generating, Utilizing A Machine-Learning Mask Model, A Mask For The Object Portrayed In The Digital Image From The Modified Feature Representation _808_

*Fig. 8*

MACHINE-LEARNING MODELS FOR DISTRACTOR SEGMENTATION WITH REDUCED USER INTERACTIONS

BACKGROUND

Recent years have seen developments in hardware and software platforms segmenting objects in digital media. For example, conventional segmentation systems utilize computer-implemented models to identify distinct portions of a digital image. To illustrate, conventional segmentation systems classify objects in the digital image according to semantic labels. Despite these developments, conventional systems suffer from a number of technical deficiencies, including inflexibility (by requiring numerous positive and negative clicks to identify objects to segment), inefficiency (by re-embedding an image for each click), and inaccuracy (by missing portions of an object to segment, or by identifying overbroad portions of the digital image for segmentation, including salient objects that should not be segmented).

BRIEF SUMMARY

Embodiments of the present disclosure provide benefits and/or solve one or more problems in the art with systems, non-transitory computer-readable media, and methods for utilizing a machine-learning model to generate a mask for an object portrayed in a digital image based on a selection of the object. In some embodiments, the disclosed systems encode the digital image to extract feature maps for the image. With the feature maps, in some implementations, the disclosed systems integrate a click map (e.g., a binary map depicting a location of a single click over the object) to generate click-embedded feature maps. The disclosed systems, in some embodiments, process the click-embedded feature maps through a machine-learning mask model to generate a segmentation mask for the object. In one or more embodiments, the disclosed systems also process the click-embedded feature maps through an object detection model to generate a plurality of masking proposals for the object. The disclosed systems can filter the masking proposals based on the location of the click, and process the masking proposals through the machine-learning mask model to enhance the segmentation mask for the object.

The following description sets forth additional features and advantages of one or more embodiments of the disclosed methods, non-transitory computer-readable media, and systems. In some cases, such features and advantages are evident to a skilled artisan having the benefit of this disclosure, or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

FIG. 3 illustrates a schematic diagram of a click integration model, an object detection model, and a machine-learning mask model in accordance with one or more embodiments.

FIG. 8 illustrates a flowchart of a series of acts for generating a mask for an object portrayed in a digital image in accordance with one or more embodiments.

DETAILED DESCRIPTION

Figure 1:
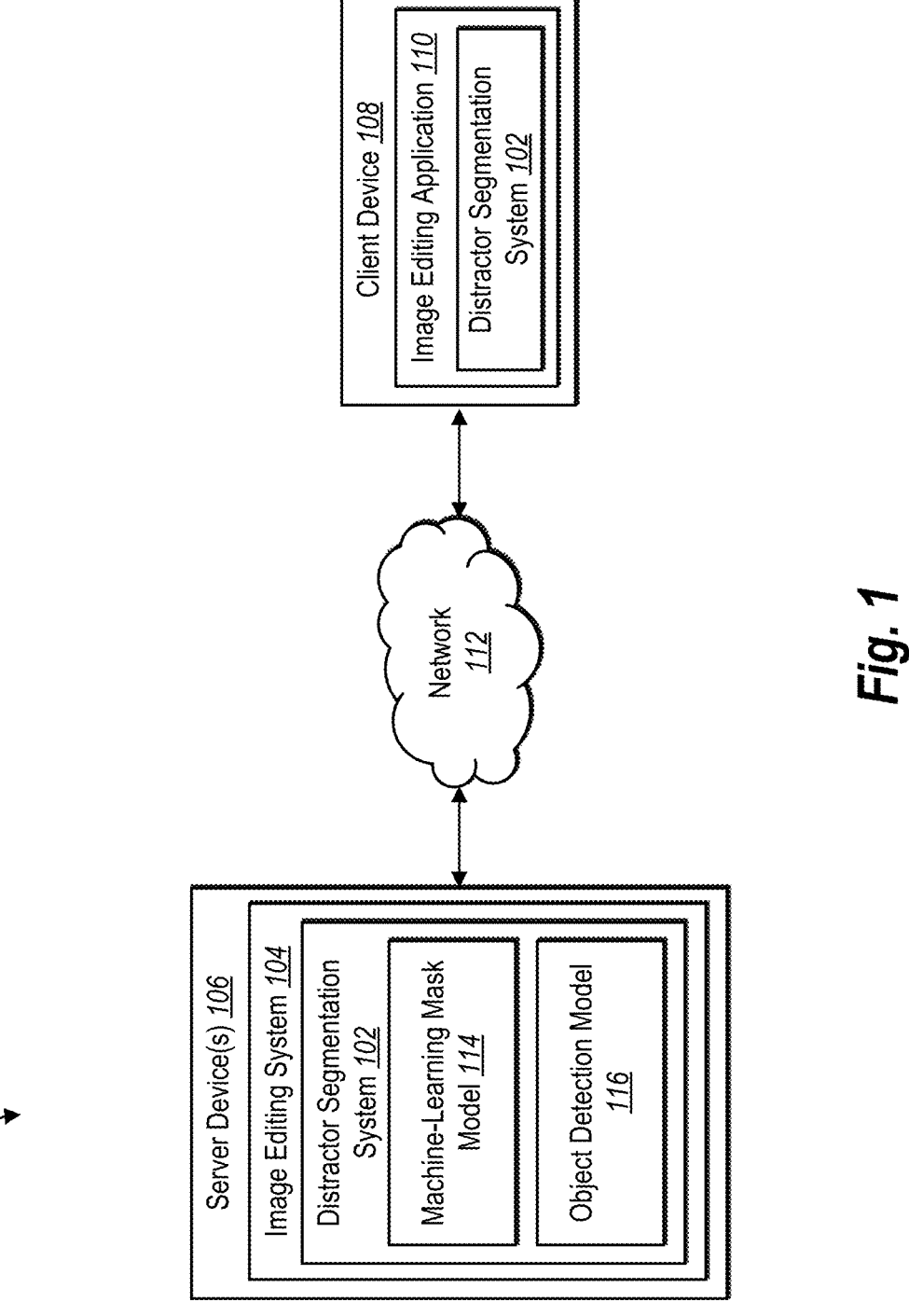
FIG. 1 illustrates a diagram of an environment in which a distractor segmentation system operates in accordance with one or more embodiments.

This disclosure describes one or more embodiments of a distractor segmentation system that generates a mask for a distractor object in a digital image based on a selection of the object. In some implementations, the mask is utilized to remove the distractor object and inpaint the digital image in place of the distractor object, thereby emphasizing the main subject of the image and enhancing image quality. In particular, in some embodiments, the object is a small or medium-sized object in a photograph, including objects in rare categories without traditional semantic labels. In some embodiments, the distractor segmentation system receives a single click for the object and generates the mask based on the single click.

To illustrate, the distractor segmentation system utilizes a feature extraction model to encode the digital image by extracting feature maps at varying resolutions. In some embodiments, the distractor segmentation system integrates a click position into the feature maps. For instance, the distractor segmentation system integrates one or more click maps of the selection (e.g., the single click) with the feature maps to generate click-embedded feature maps. The distractor segmentation system processes the click-embedded feature maps through a machine-learning mask model to generate a segmentation mask for the object.

In some cases, the distractor segmentation system also processes the click-embedded feature maps through an object detection model to generate a plurality of masking proposals for the object. For example, the distractor segmentation system generates the masking proposals in the form of bounding boxes (or other shapes/boundaries) that suggest proposed regions for an object location in the digital image. In some cases, the distractor segmentation system filters the masking proposals based on the click position (e.g., to remove some of the plurality of masking proposals from consideration by the machine-learning mask model). The distractor segmentation system can then process a subset of the masking proposals (e.g., the filtered masking proposals) through the machine-learning mask model to enhance the segmentation mask for the object (e.g., by increasing the accuracy of the segmentation mask and/or by increasing the efficiency of the machine-learning mask model).

In some implementations, the distractor segmentation system encodes the digital image only once. For example, the distractor segmentation system utilizes the feature extraction model to extract the feature maps from the digital image before integrating the click position. In some cases, the distractor segmentation system receives one or more additional selections (e.g., additional clicks and/or scribble inputs). The distractor segmentation system can integrate these one or more additional selections (e.g., by using additional click maps) with the feature maps to generate additional click-embedded feature maps. By encoding the digital image before integrating the click position(s), the distractor segmentation system can efficiently integrate additional click positions with the feature maps. For instance, the distractor segmentation system does not require further encoding of the digital image, thereby saving computational resources when additional selection inputs are received.

In some embodiments, the distractor segmentation system generates masking proposals to facilitate the mask generation process. To illustrate, the distractor segmentation system utilizes the object detection model to generate a plurality of masking proposals (e.g., one hundred masking proposals, two hundred masking proposals, etc.) for the object portrayed in the digital image. The distractor segmentation system processes the click-embedded feature maps through the object detection model to generate the masking proposals. In some implementations, the distractor segmentation system filters the generated masking proposals based on the click position (or click positions). For example, the distractor segmentation system removes the masking proposals that do not intersect the click position on the digital image from the set of masking proposals to be used for mask generation. Thus, in some implementations, the distractor segmentation system processes a subset of the plurality of masking proposals through the machine-learning mask model.

In some embodiments, the distractor segmentation system generates a plurality of masks based on the subset of the plurality of masking proposals (or, alternatively, based on the full set of the plurality of masking proposals). For instance, the distractor segmentation system generates a mask for each of the subset of masking proposals. Additionally, in some embodiments, the distractor segmentation system generates confidence scores for the plurality of masks, indicating likelihoods that the masks correspond with the object portrayed in the digital image. The distractor segmentation system selects a mask from the plurality of masks (to be the segmentation mask for the object) based on the confidence scores.

In some implementations, the distractor segmentation system trains the machine-learning mask model to generate masks for objects in digital images. For instance, the distractor segmentation system receives training images portraying various objects. Additionally, the distractor segmentation system receives ground truth masks corresponding to the objects portrayed in the training images. The distractor segmentation system simulates clicks based on centers of the objects. The distractor segmentation system utilizes the simulated clicks to generate click-embedded feature maps for the training images. With the click-embedded feature maps, the distractor segmentation system utilizes the machine-learning mask model to generate segmentation masks for the objects. The distractor segmentation system then compares the segmentations masks for the objects with their corresponding ground truth masks for the objects. Based on these comparisons, the distractor segmentation system determines measures of loss to tune parameters of the machine-learning mask model. In some embodiments, the distractor segmentation system utilizes training datasets having medium-sized and small ground truth masks to train the machine-learning mask model to generate masks for medium-sized and small distractor objects based on a single click.

As mentioned, conventional segmentation systems suffer from a number of technical problems. For example, conventional systems often are inflexible, by requiring multiple clicks or selection inputs to identify objects for segmentation in a digital image. For instance, in many cases, conventional systems require a user to input several clicks on an object for the conventional system to correctly identify the object. In many instances, conventional systems are overbroad with segmenting distractor objects in an image. Furthermore, in some cases, conventional systems require both "positive clicks" and "negative clicks," where the positive clicks identify portions of an object to be removed from an image, and the negative clicks indicate portions of the image that should be retained, thereby requiring undue assistance from the user to correctly identify the distractor object.

Moreover, conventional systems are inefficient. For instance, conventional systems often re-encode digital images when a new click is received. To illustrate, while receiving the several clicks (whether positive, negative, or both), conventional systems often process the digital image through an encoder each time a click is received (e.g., to encode the click with the image). As the user adds a click, conventional systems often repeat the encoding process to encode the new click with the image.

Additionally, conventional systems often inaccurately mask certain objects. For example, in some cases, a first object is partially obscured in an image by a second object. To illustrate, an image portraying a city skyline might depict a construction crane partially obscured by a building. For example, a first portion of the crane (such as the tower and counterweights) might be depicted on the left side of the building, while a second portion of the crane (such as the jib and trolley) might be depicted on the right side of the building. In some instances, conventional systems incorrectly segment the crane by including the first portion of the crane in a mask for the crane, while excluding the second portion of the crane from the mask. As another example, in some instances, conventional systems generate masks that are overbroad. For instance, while an intent for a click might be to remove a small portion of an image, conventional systems sometimes select large portions of the image for segmentation, thereby incorrectly generating the mask.

The distractor segmentation system provides a variety of technical advantages relative to conventional systems. For example, by masking distractor objects based on a single click, the distractor segmentation system improves flexibility relative to conventional systems. Specifically, in some embodiments, the distractor segmentation system successfully segments an object in a digital image and generates a mask for the object, based on one click. Thus, in some cases, the distractor segmentation system substantially reduces the clicks or other inputs required to generate a segmentation mask, thereby alleviating the amount of required interactions with a user device.

Moreover, by encoding a digital image only once, the distractor segmentation system increases efficiency over conventional systems. For instance, the distractor segmentation system generates an image feature representation for an image, and integrates one or more clicks into the image feature representation. In cases when the distractor segmentation system receives more than one click, the distractor segmentation system integrates the additional clicks into the image feature representation, without repeating the encoding process, and thereby alleviating computational resources (e.g., storage, memory, processing time, and bandwidth). In addition, in some embodiments, the distractor segmentation system is efficient by generating a plurality of masking proposals to process through the machine-learning mask model, and filtering out some of the masking proposals that do not intersect the selection input(s). Thus, by filtering the masking proposals, the distractor segmentation system conserves computational resources when utilizing the machine-learning mask model.

Additionally, the distractor segmentation system increases accuracy over conventional systems. For instance, by generating masking proposals for a digital image, the distractor segmentation system increases accuracy of the segmentation mask. To illustrate, for a digital image with an object partially obscured, such as an image depicting the crane and building described above, the distractor segmentation system generates masking proposals that include all visible portions of the crane. The distractor segmentation system can then generate a mask for the crane that includes all portions, including on the left side of the building and on the right side of the building.

Additional detail will now be provided in relation to illustrative figures portraying example embodiments and implementations of a distractor segmentation system. For example, FIG. 1 illustrates a system 100 (or environment) in which a distractor segmentation system 102 operates in accordance with one or more embodiments. As illustrated, the system 100 includes server device(s) 106, a network 112, and a client device 108. As further illustrated, the server device(s) 106 and the client device 108 communicate with one another via the network 112.

As shown in FIG. 1, the server device(s) 106 includes an image editing system 104 that further includes the distractor segmentation system 102. In some embodiments, the distractor segmentation system 102 generates a mask for an object portrayed in a digital image. In some embodiments, the distractor segmentation system 102 trains a machine-learning mask model 114. In some embodiments, the server device(s) 106 includes, but is not limited to, a computing device (such as explained below with reference to FIG. 9).

In some instances, the distractor segmentation system 102 receives a request (e.g., from the client device 108) to mask one or more objects in a digital visual media item (e.g., in a digital image, in a digital video). For example, the request includes a selection input identifying the one or more objects as distractor objects to remove from a digital image, and an instruction to segment the one or more objects from the remainder of the digital image. To illustrate, the distractor segmentation system 102 generates a mask for the one or more objects in the digital image, and the distractor segmentation system 102 (or another system) utilizes the mask to remove the one or more objects and inpaint the portion(s) of the digital image where the one or more objects are removed (e.g., by generating replacement pixels for the removed portion(s)). Some embodiments of server device(s) 106 perform a variety of functions via the image editing system 104 on the server device(s) 106. For example, the server device(s) 106 (through the distractor segmentation system 102 on the image editing system 104) performs functions such as, but not limited to, obtaining a digital image, generating an image feature representation from the digital image, receiving a selection input identifying one or more pixels corresponding to an object portrayed in the digital image, generating a modified feature representation by integrating the selection input into the image feature representation, and/or generating a mask for the object portrayed in the digital image from the modified feature representation. In some embodiments, the server device(s) 106 utilizes a machine-learning mask model 114 to generate the mask for the object. In one or more embodiments, the server device(s) 106 utilizes an object detection model 116 to generate masking proposals for the object. The server device(s) 106, in one or more embodiments, utilizes the masking proposals to generate the mask for the object. In some embodiments, the server device(s) 106 trains the machine-learning mask model 114 as described herein.

Furthermore, as shown in FIG. 1, the system 100 includes the client device 108. In some embodiments, the client device 108 includes, but is not limited to, a mobile device (e.g., a smartphone, a tablet), a laptop computer, a desktop computer, or any other type of computing device, including those explained below with reference to FIG. 9. Some embodiments of client device 108 perform a variety of functions via an image editing application 110 on client device 108. For example, the client device 108 (through the image editing application 110) performs functions such as, but not limited to, capturing or receiving a digital image, generating an image feature representation from the digital image, receiving a selection input identifying one or more pixels corresponding to an object portrayed in the digital image, generating a modified feature representation by integrating the selection input into the image feature representation, and/or generating a mask for the object portrayed in the digital image from the modified feature representation. In some embodiments, the client device 108 utilizes the machine-learning mask model 114 to generate the mask for the object. In one or more embodiments, the client device 108 utilizes the object detection model 116 to generate the masking proposals for the object. The client device 108, in one or more embodiments, utilizes the masking proposals to generate the mask for the object. In some embodiments, the client device 108 trains the machine-learning mask model 114 as described herein.

To access the functionalities of the distractor segmentation system 102 (as described above and in greater detail below), in one or more embodiments, a user interacts with the image editing application 110 on the client device 108. For example, the image editing application 110 includes one or more software applications (e.g., to interact with and/or modify digital images in accordance with one or more embodiments described herein) installed on the client device 108, such as a masking application. In certain instances, the image editing application 110 is hosted on the server device(s) 106. Additionally, when hosted on the server device(s) 106, the image editing application 110 is accessed by the client device 108 through a web browser and/or another online interfacing platform and/or tool.

As illustrated in FIG. 1, in some embodiments, the distractor segmentation system 102 is hosted by the image editing application 110 on the client device 108 (e.g., additionally or alternatively to being hosted by the image editing system 104 on the server device(s) 106). For example, the distractor segmentation system 102 performs the masking techniques described herein on the client device 108. In some implementations, the distractor segmentation system 102 utilizes the server device(s) 106 to train and implement machine-learning models (such as the machine-learning mask model 114). In one or more embodiments, the distractor segmentation system 102 utilizes the server device(s) 106 to train machine-learning models (such as the machine-learning mask model 114) and utilizes the client device 108 to implement or apply the machine-learning models.

Further, although FIG. 1 illustrates the distractor segmentation system 102 being implemented by a particular component and/or device within the system 100 (e.g., the server device(s) 106 and/or the client device 108), in some embodiments the distractor segmentation system 102 is implemented, in whole or in part, by other computing devices and/or components in the system 100. For instance, in some embodiments, the distractor segmentation system 102 is implemented on another client device. More specifically, in one or more embodiments, the description of (and acts performed by) the distractor segmentation system 102 are implemented by (or performed by) the image editing application 110 on another client device.

In some embodiments, the image editing application 110 includes a web hosting application that allows the client device 108 to interact with content and services hosted on the server device(s) 106. To illustrate, in one or more implementations, the client device 108 accesses a web page or computing application supported by the server device(s) 106. The client device 108 provides input to the server device(s) 106 (e.g., files of digital images, selection inputs). In response, the distractor segmentation system 102 on the server device(s) 106 performs operations described herein to generate one or more masks for one or more objects in the digital images. The server device(s) 106 provides the output or results of the operations (e.g., one or more masks or one or more masked digital images) to the client device 108. As another example, in some implementations, the distractor segmentation system 102 on the client device 108 performs operations described herein to generate one or more masks for one or more objects in the digital images. The client device 108 provides the output or results of the operations (e.g., one or more masks or one or more masked digital images) via a display of the client device 108, and/or transmits the output or results of the operations to another device (e.g., the server device(s) 106 and/or another client device).

Additionally, as shown in FIG. 1, the system 100 includes the network 112. As mentioned above, in some instances, the network 112 enables communication between components of the system 100. In certain embodiments, the network 112 includes a suitable network and may communicate using any communication platforms and technologies suitable for transporting data and/or communication signals, examples of which are described with reference to FIG. 9. Furthermore, although FIG. 1 illustrates the server device(s) 106 and the client device 108 communicating via the network 112, in certain embodiments, the various components of the system 100 communicate and/or interact via other methods (e.g., the server device(s) 106 and the client device 108 communicate directly).

Figure 2:
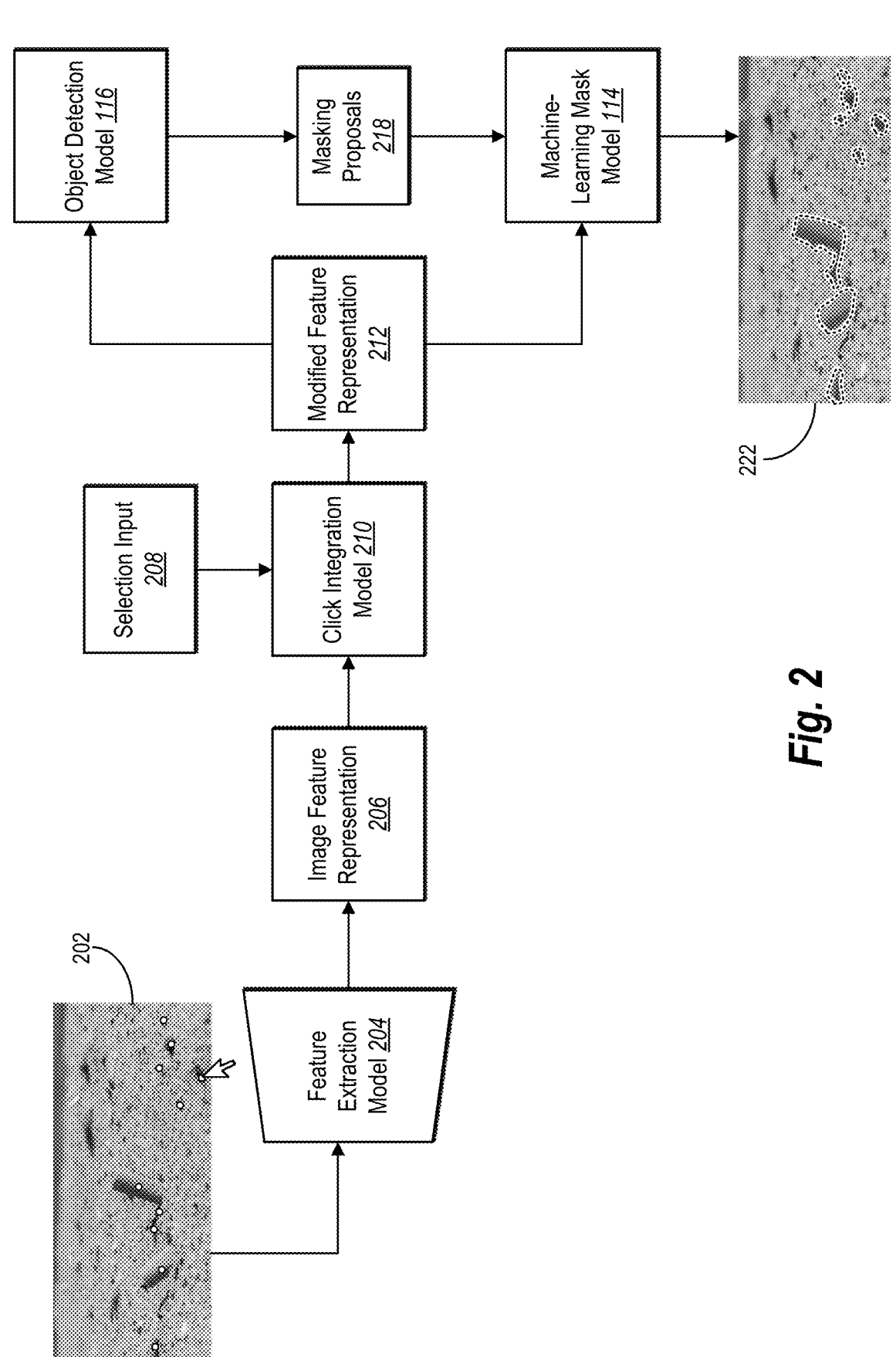
FIG. 2 illustrates processes for generating a segmentation mask in accordance with one or more embodiments.

As discussed above, the distractor segmentation system 102 can generate masks for objects portrayed in digital images. For instance, FIG. 2 illustrates the distractor segmentation system 102 receiving a digital image 202 and processing the digital image 202 to generate a segmentation mask 222 in accordance with one or more embodiments. To illustrate, the distractor segmentation system 102 processes the digital image 202 through a feature extraction model 204. The distractor segmentation system 102 utilizes the feature extraction model 204 to generate an image feature representation 206 from the digital image 202.

The distractor segmentation system 102 processes the image feature representation 206 through a click integration model 210. Additionally, the distractor segmentation system 102 receives a selection input 208 and processes the selection input 208 through the click integration model 210.

Utilizing the click integration model 210, the distractor segmentation system 102 generates a modified feature representation 212 by integrating the selection input 208 with the image feature representation 206. Additional details of the click integration model 210 are provided below in connection with FIG. 3.

The distractor segmentation system 102 then processes the modified feature representation 212 through the machine-learning mask model 114 to generate the mask 222. In some implementations the distractor segmentation system 102 processes the modified feature representation 212 through the object detection model 116 to generate masking proposals 218. The distractor segmentation system 102 utilizes the masking proposals 218 with the machine-learning mask model 114 to generate the mask 222.

As mentioned, in some embodiments, the distractor segmentation system 102 utilizes the feature extraction model 204. The feature extraction model 204 can be one or more of a variety of machine-learning models. A machine learning model includes a computer representation that is tunable (e.g., trained) based on inputs to approximate unknown functions used for generating the corresponding outputs. In particular, a machine learning model includes a computer-implemented model that utilizes algorithms to learn from, and make predictions on, known data by analyzing the known data to learn to generate outputs that reflect patterns and attributes of the known data. For instance, in some instances, a machine learning model includes, but is not limited to a neural network (e.g., a convolutional neural network, recurrent neural network or other deep learning network), a decision tree (e.g., a gradient boosted decision tree), association rule learning, inductive logic programming, support vector learning, Bayesian network, regression-based model (e.g., censored regression), principal component analysis, or a combination thereof.

Similarly, a neural network includes a machine learning model of interconnected artificial neurons (e.g., organized in layers) that communicate and learn to approximate complex functions and generate outputs. In some cases, a neural network refers to an algorithm (or set of algorithms) that implements deep learning techniques to model high-level abstractions in data. For example, a neural network can include a convolutional neural network, a recurrent neural network (e.g., an LSTM), a graph neural network, or a generative adversarial neural network.

For example, in some embodiments, the feature extraction model 204 is a convolutional neural network. In some implementations, the feature extraction model 204 is a transformer-based machine-learning model, such as a vision transformer. The distractor segmentation system 102 utilizes the feature extraction model 204 to generate the image feature representation 206 by encoding the digital image 202. An image feature representation includes a numerical representation of features (e.g., digital image features/pixels). For instance, a feature representation includes a feature map or feature vector representation of a digital image. To illustrate, a feature representation includes a latent feature vector representation of a digital image generated by one or more layers of a neural network.

For example, the distractor segmentation system 102 generates feature maps at different resolutions. To illustrate, the distractor segmentation system 102 utilizes the feature extraction model 204 to generate a plurality of feature maps at different resolutions. For instance, the distractor segmentation system 102 utilizes the feature extraction model 204 to generate a first image feature representation at a first resolution and a second image feature representation at a second resolution different from the first resolution. The image feature representations contain encoded information from the digital image 202 and make up the image feature representation 206.

To illustrate symbolically, for a digital image $I \in \mathbb{R}^{H \times W \times 3}$, the distractor segmentation system 102 generates a pyramid feature map $\mathcal{F} = \{X_1, \ldots, X_N\}$ having individual feature representations $X_i \in \mathbb{R}^{h^i \times w^i \times d}$, where $H > h^1 > \ldots > h^N$ representing pixel heights of the digital image and the several individual feature representations, and $W > w^1 > \ldots > w^N$ representing pixel widths of the digital image and the several individual feature representations.

As described with additional specificity below in connection with FIG. 3, the distractor segmentation system 102 utilizes the image feature representation 206 and the selection input 208 to generate a modified feature representation 212. For example, utilizing the click integration model 210, the distractor segmentation system 102 receives the selection input 208 and integrates the selection input 208 into the image feature representation 206 to generate the modified feature representation 212. In some cases, the selection input 208 corresponds to an object portrayed in the digital image 202. To illustrate, the selection input 208 identifies one or more pixels corresponding to the object portrayed in the digital image 202. A selection input includes an input via a computing device (e.g., indicating one or more pixels or regions of a digital image). A selection input includes a variety of user inputs via input devices corresponding to a computer, such as a touchscreen, mouse, keyboard, or trackpad. A selection input can thus include a click, a scribble input (e.g., a click-and-drag line or curve comprising a locus of pixels), a click-and-drag bounding box, a lasso, or another type of indication of one or more pixels of a digital image.

In some embodiments, the distractor segmentation system 102 processes the modified feature representation 212 through the machine-learning mask model 114 to generate the mask 222. For instance, as further described in connection with FIG. 3, the distractor segmentation system 102 generates, utilizing the machine-learning mask model 114, the mask 222 for the object portrayed in the digital image 202 from the modified feature representation 212.

In some cases, the distractor segmentation system 102 receives more than one selection input 208. While not necessary for mask generation (i.e., the distractor segmentation system 102 can successfully generate the mask 222 based on a single selection input 208), additional selection inputs 208 can facilitate mask generation. For instance, the distractor segmentation system 102 receives an additional selection input identifying an additional one or more pixels corresponding to the object portrayed in the digital image 202. In some embodiments, the distractor segmentation system 102 generates an additional modified feature representation by integrating the selection input 208 and the additional selection input into the image feature representation 206. In some embodiments, the distractor segmentation system 102 generates the modified feature representation 212 by integrating the selection input 208 and the additional selection input into the image feature representation 206.

In some implementations, the distractor segmentation system 102 generates the mask 222 from the modified feature representation 212 generated based on both the selection input 208 and the additional selection input. In some implementations, the distractor segmentation system 102 generates a mask from the additional modified feature representation generated based on the additional selection input. For instance, the distractor segmentation system 102 generates, utilizing the machine-learning mask model 114, a refined mask for the object portrayed in the digital image 202 from the additional modified feature representation.

As mentioned, in some implementations, the distractor segmentation system 102 optionally utilizes the object detection model 116 to generate masking proposals 218. In particular, the distractor segmentation system 102 generates, utilizing the object detection model 116, a plurality of masking proposals 218 for the object portrayed in the digital image 202 from the modified feature representation 212. A masking proposal includes a candidate area of a digital image corresponding to an object (e.g., a distractor object). For instance, a masking proposal includes a bounding box or other closed shape denoting a candidate area that may contain the object to be segmented. For example, a masking proposal includes a candidate bounding box which the object detection model 116 suggests as possibly bounding the distractor object. A distractor object (or object, or object to be removed) includes any foreground object or background object (e.g., that detracts from the visual qualities of a digital image and/or that a user seeks to remove). For instance, a distractor object includes an object that affects the aesthetic level of a photograph, including but not limited to unexpected pedestrians, cropped objects on a photograph edge, dirty spots on the ground, repeated electrical outlets on a wall, and colorful/blurry lens flare. Additional examples of a distractor object are cigarette butts, puddles, and bird droppings on the ground.

In some embodiments, the distractor segmentation system 102 generates the mask 222 based on the modified feature representation 212 and the masking proposals 218. For instance, the distractor segmentation system 102 generates, utilizing the machine-learning mask model 114, the mask 222 for the object portrayed in the digital image 202 from the modified feature representation 212 and the plurality of masking proposals 218.

To illustrate, and as described in additional detail in connection with FIG. 3, the distractor segmentation system 102 utilizes the object detection model 116 to generate numerous (e.g., two hundred) masking proposals 218 of various shapes and sizes. In some cases, the distractor segmentation system 102 identifies a subset of the masking proposals 218 by filtering the plurality of masking proposals 218 based on the selection input 208. For example, the distractor segmentation system 102 filters the masking proposals 218 by removing some (e.g., one hundred and fifty) of the masking proposals 218 that do not intersect the selection input 208 (or the multiple selection inputs, as the case may be). Then, the distractor segmentation system 102 processes the subset (e.g., the remaining fifty) of the masking proposals 218 that do intersect the selection input 208 through the machine-learning mask model 114 to generate the mask 222.

The distractor segmentation system 102 can process the masking proposals 218 and the modified feature representation 212. For example, in some embodiments, the distractor segmentation system 102 crops the input digital image according to a masking proposal and then generates the mask 222 from within the cropped portion of the digital image reflected by the masking proposal. In some implementations, the distractor segmentation system 102 provides the digital image, the masking proposal (e.g., the boundary of the proposed mask), and the modified feature representation (e.g., through different channels of the machine-learning mask model 114). The machine-learning mask model 114 can process each of these inputs as signals to generate the segmentation mask 222 from the digital image.

In some embodiments, the distractor segmentation system 102 utilizes the machine-learning mask model 114 to generate a plurality of masks and a plurality of confidence scores for the object portrayed in the digital image 202 from the modified feature representation 212 and the subset of the masking proposals 218. For example, the distractor segmentation system 102 generates a mask for each masking proposal in the subset of masking proposals. Additionally, for example, the distractor segmentation system 102 generates a confidence score for each masking proposal in the subset of masking proposal. Then, the distractor segmentation system 102 selects the mask 222 from the plurality of masks based on the plurality of confidence scores. For instance, the distractor segmentation system 102 generates the mask 222 for the object by selecting the mask corresponding to the masking proposal with the highest confidence score of the subset of the masking proposals 218.

As mentioned, in some implementations, the distractor segmentation system 102 generates the mask 222 of the object to remove the object from the digital image 202. In particular, in some implementations, the distractor segmentation system 102 removes the object by removing pixels within the mask 222 from the digital image 202. In some embodiments, the distractor segmentation system 102 inpaints the digital image 202 with replacement pixels (e.g., by using an inpainting neural network, such as CoMOD-GAN or another inpainting model architecture). In some embodiments, the distractor segmentation system 102 transmits the digital image 202 to another system to inpaint the digital image 202. By contrast, in some implementations, the distractor segmentation system 102 does not remove the object from the digital image 202. For example, the distractor segmentation system 102 generates the mask 222 to identify the object for other editing techniques, such as modifications to the tone or brightness of the object.

As discussed above, the distractor segmentation system 102 integrates the selection input 208 with the image feature representation 206 to generate the modified feature representation 212. To illustrate, FIG. 3 depicts additional detail of the distractor segmentation system 102 utilizing the click integration model 210 to integrate the selection input 208 into the image feature representation 206 in accordance with one or more embodiments. For example, FIG. 3 illustrates the distractor segmentation system 102 generating interaction maps in the form of binary click maps $$I_i^c \in \{0, 1\}^{h^i \times w^i}$$

from the selection input 208, where $$I_{i_{x,y}}^c = 1$$

indicates a selection input (e.g., a click) at spatial location (x, y) in $$I_i^c.$$

An interaction map includes a representation of a user interaction (e.g., relative to a digital image). For instance, an interaction map includes a representation of a region or pixels within a digital image selected via a user input device. To illustrate, an interaction map includes a click map (e.g., a binary click map, such as a binary representation of a click), a distance map, or some other representation of a selection input. For example, an interaction map comprises an encoded pixel location corresponding to the selection input 208. Additionally, FIG. 3 illustrates the distractor segmentation system 102 combining the interaction maps $$I_1^c$$

through $$I_N^c$$

with individual feature representations $X_1$ through $X_N$ to generate modified individual feature representations $X'_1$ through $X'_N$ that make up the modified feature representation 212. An individual feature representation includes a feature map, and a modified individual feature representation includes a modified feature map, such as a click-embedded feature map.

In particular, FIG. 3 depicts a plurality of individual feature representations $X_1$ through $X_N$ that make up the image feature representation 206. Additionally, FIG. 3 depicts a plurality of interaction maps $$I_1^c$$

through $$I_N^c.$$

The distractor segmentation system 102 generates the plurality of interaction maps $$I_1^c$$

through $$I_N^c$$

by down-sampling the selection input 208 to a plurality of resolutions that match corresponding individual feature representations $X_1$ through $X_N$ contained in the image feature representation 206. The distractor segmentation system 102 combines (e.g., concatenates, adds, or otherwise combines) the interaction maps $$I_1^c$$

through $$I_N^c$$

with the corresponding individual feature representations $X_1$ through $X_N$. For example, in some embodiments, the distractor segmentation system 102 concatenates the interaction maps $$I_1^c$$

through $$I_N^c$$

with the individual feature representations $X_1$ through $X_N$. In this way, the distractor segmentation system 102 generates modified individual feature representations $X'_1$ through $X'_N$ that make up the modified feature representation 212. To illustrate symbolically, the distractor segmentation system 102 generates the modified individual feature representations $X'_i \in \mathbb{R}^{h^i \times w^i \times (d+c)}$. For example, the distractor segmentation system 102 computes the modified individual feature representations according to $$X'_i = X_i \oplus conv_i(I_i^c),$$

where $\oplus$ indicates the concatenation operation along the feature map dimension, and $conv_i$ is a mapping function that projects $$I_i^c$$

to $\mathbb{R}^{h^i \times w^i \times c}$.

As mentioned, in some cases, the selection input 208 is a scribble input comprising a locus of pixels. For example, the distractor segmentation system 102 receives the selection input 208 by receiving, via a user interface of a client device, the scribble input comprising the locus of pixels. In some embodiments, the distractor segmentation system 102 samples the scribble input to generate a representative click or pixel from the scribble input. A variety of sampling methods can be used to generate the representative click. For instance, the distractor segmentation system 102 selects a pixel from the locus of pixels of the selection input 208 based on a probability distribution. The probability distribution can be based from a starting point of the locus of pixels, an ending point of the locus of pixels, a midpoint of the locus of pixels, or some other distribution. In some implementations, the distractor segmentation system 102 determines a center or centroid of the scribble input and utilizes the centroid as the representative click or pixel.

Upon identifying a representative pixel, the distractor segmentation system 102 integrates the representative click as the selection input 208 into the image feature representation 206 by generating the interaction maps $$I_1^c$$

through $$I_N^c$$

from the representative click and combining the interaction maps $$I_1^c$$

through $$I_N^c$$

and the image feature representation 206. In some implementations, the distractor segmentation system 102 generates the interaction maps $$I_1^c$$

through $$I_N^c$$

from the scribble input by generating distance maps comprising distances from the various pixels to the closest pixel on the scribble input.

As discussed above, in some embodiments, the distractor segmentation system 102 generates a plurality of image feature representations at differing resolutions (e.g., the plurality of individual feature representations $X_1$ through $X_N$). The distractor segmentation system 102 can combine these image feature representations with interaction maps. To illustrate, the distractor segmentation system 102 generates a first interaction map $$I_1^c$$

at a first resolution and a second interaction map $$I_2^c$$

at a second resolution different from the first resolution. The distractor segmentation system 102 combines the first interaction map $$I_1^c$$

with the first image feature representation $X_1$ and the second interaction map $$I_2^c$$

with the second image feature representation $X_2$ to generate the modified feature representation 212. In other words, the distractor segmentation system 102 can generate the modified feature representation 212 by combining the first interaction map $$I_1^c$$

and the second interaction map $$I_2^c$$

with the image feature representation 206.

As discussed, the distractor segmentation system 102 utilizes the machine-learning mask model 114 and (optionally) the object detection model 116 to generate segmentation masks such as the mask 222. For instance, the distractor segmentation system 102 utilizes the object detection model 116 to generate the plurality of masking proposals 218 based on the modified feature representations $X'_i$. Additionally, the distractor segmentation system 102 utilizes the machine-learning mask model 114 to generate the segmentation mask 222 based on the modified feature representations $X'_i$. The distractor segmentation system 102 can generate a plurality of segmentation masks 222, which can be represented symbolically as $M_j \in \{0, 1\}^{H \times W}$.

Figure 4:
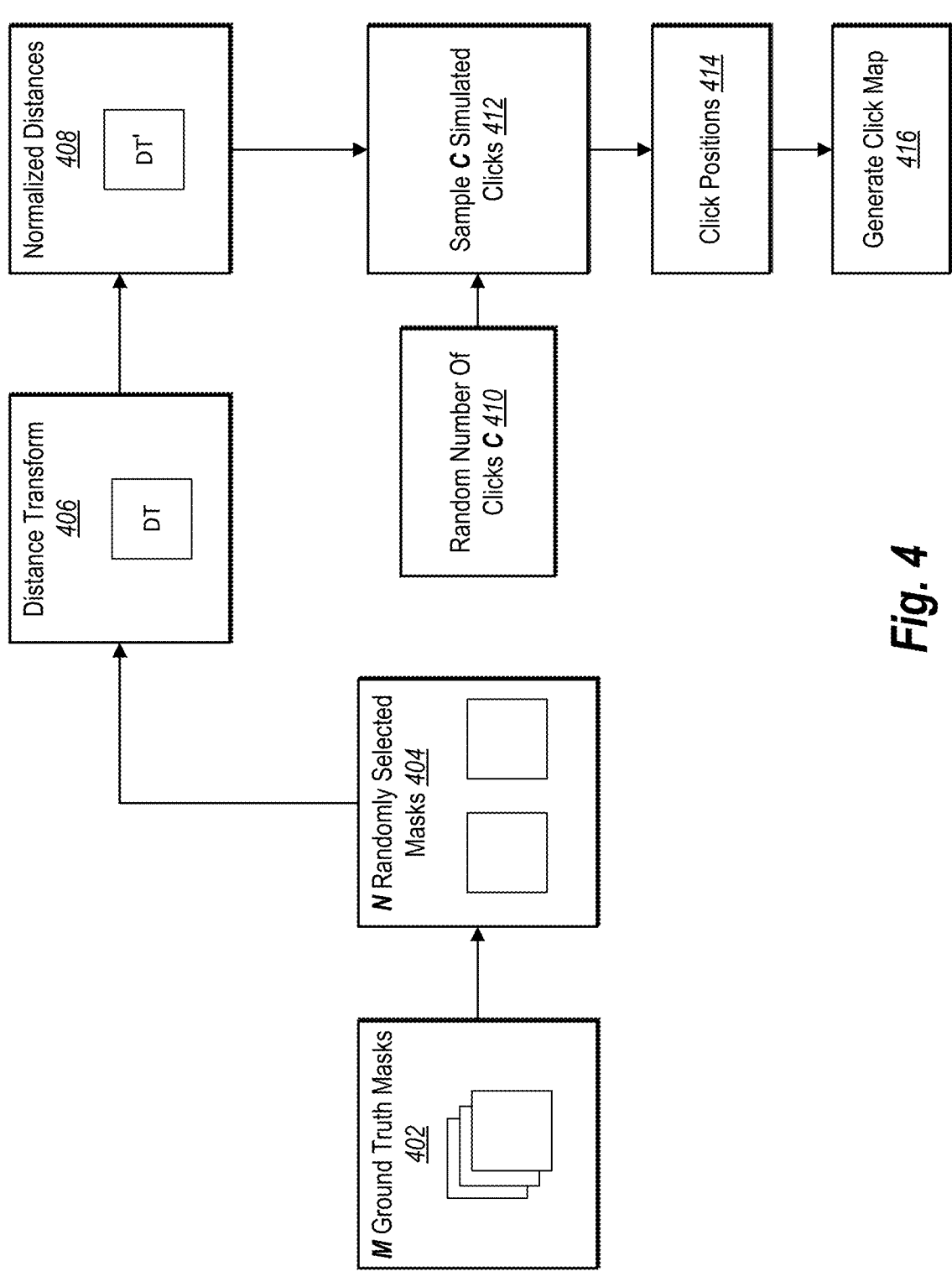
FIG. 4 illustrates a process for generating a simulated selection input to train a machine-learning mask model in accordance with one or more embodiments.

The distractor segmentation system 102 can utilize a variety of architectures for the machine-learning mask model 114. For example, the distractor segmentation system 102 can utilize a convolutional neural network trained to segment digital images. Moreover, in one or more embodiments, the distractor segmentation system 102 utilizes a machine learning model as described by Lu Qi, Jason Kuen, Yi Wang, Jiuxiang Gu, Hengshuang Zhao, Zhe Lin, Philip Torr, and Jiaya Jia in Open-world entity segmentation, arXiv preprint arXiv:2107.14228, 2021, which is incorporated herein by reference in its entirety. The distractor segmentation system 102 can also utilize similar architectures for the object detection model 116. As mentioned, the distractor segmentation system 102 can train the machine-learning mask model 114. As part of the training process, the distractor segmentation system 102 can simulate selection inputs. For instance, FIG. 4 illustrates the distractor segmentation system 102 sampling simulated clicks and generating an interaction map in accordance with one or more embodiments. Specifically, FIG. 4 shows the distractor segmentation system 102 obtaining ground truth masks 402, selecting a subset 404 of the ground truth masks 402, determining a distance transform 406 for each of the masks in the subset 404, determining a normalized distance map 408 based on the distance transform 406, selecting a number of clicks 410, sampling simulated clicks 412, determining click positions 414, and generating a click map 416.

To illustrate, the distractor segmentation system 102 obtains a number (e.g., an integer M) of ground truth masks 402. For instance, the distractor segmentation system 102 receives M ground truth masks 402 for M distractor objects portrayed in a training image. The ground truth masks 402 are segmentations for the distractor objects. In some embodiments, the distractor segmentation system 102 randomly selects a subset 404 of ground truth masks having a number (e.g., an integer N) of the ground truth masks 402. In some implementations, the number N of randomly selected ground truth masks is less than or equal to half of the number M of ground truth masks. The distractor segmentation system 102 utilizes the subset 404 of ground truth masks to train the machine-learning mask model 114.

In some implementations, the distractor segmentation system 102 determines a center of each distractor object in the subset 404 of ground truth masks. A center of an object portrayed in an image includes a geometric center, a centroid, and a maximum value of a distance transform. For example, the distractor segmentation system 102 determines a distance transform 406 of a distractor object in the training image. To illustrate, the distractor segmentation system 102 determines an edge or a boundary of the distractor object. The distractor segmentation system 102 generates a binary map of the training image, assigning pixels inside the boundary of the distractor object with a value of one, and assigning pixels outside the boundary of the object with a value of zero. The distractor segmentation system 102 generates the distance transform 406 from the binary map. For example, the distractor segmentation system 102 generates the distance transform 406 for the distractor object by assigning pixel values representing distances to the boundary of the distractor object. To illustrate, each pixel of the binary map having a value of one has a corresponding pixel in the distance transform 406 having a value of the distance to the closest boundary point. A variety of distances can be used for the distance transform 406, including the Euclidean distance, the Manhattan distance, or the Chebyshev distance.

Having the distance transform 406, the distractor segmentation system 102 can normalize the distance transform 406 to generate a normalized distance map 408. For instance, the distractor segmentation system 102 generates normalized distances by dividing each pixel value in the distance transform 406 by a total value of the distance transform 406 (e.g., a sum of all pixel values in the distance transform 406). The normalized distances make up a normalized distance map 408, and the distractor segmentation system 102 utilizes the normalized distance map 408 as a probability map for randomly sampling click positions for training the machine-learning mask model 114.

As mentioned, in some embodiments, the distractor segmentation system 102 simulates selection inputs for training the machine-learning mask model 114 by generating a simulated selection input based on the center of the object portrayed in the digital image. To illustrate, the distractor segmentation system 102 randomly chooses a number (e.g., an integer C) of clicks 410. In some implementations, the number C of clicks 410 is within the range of one to five, inclusive (e.g., 1, 2, or 4). The distractor segmentation system 102 samples C simulated clicks 412 based on the normalized distance map 408. For example, the distractor segmentation system 102 randomly selects pixels of the normalized distance map 408, with the pixel values of the normalized distance map 408 serving as probabilities for sampling. The distractor segmentation system 102 determines the click positions 414 from this process, and generates the click map 416 with the click positions 414.

To illustrate, if the distractor segmentation system 102 randomly chooses a value for C of three, the distractor segmentation system 102 randomly samples three locations on the normalized distance map 408 that become the click positions 414. The distractor segmentation system 102 then generates the click map 416 using the three randomly selected click positions. For example, the distractor segmentation system 102 generates a click map 416 comprising individual interaction maps $$I_1^c$$

through $$I_N^c$$

from the three randomly selected click positions 414, each interaction map $$I_1^c$$

through $$I_N^c$$

having a different resolution, as described above for FIG. 3. In some implementations, the distractor segmentation system 102 generates the click map 416 having a pixel group for each click position 414, wherein the pixel group is grouping of pixels with a small radius (e.g., a radius of five pixels). For instance, the pixels in each pixel group for each click position 414 have white values, while the remainder of pixels in the click map 416 have black values.

Figure 5:
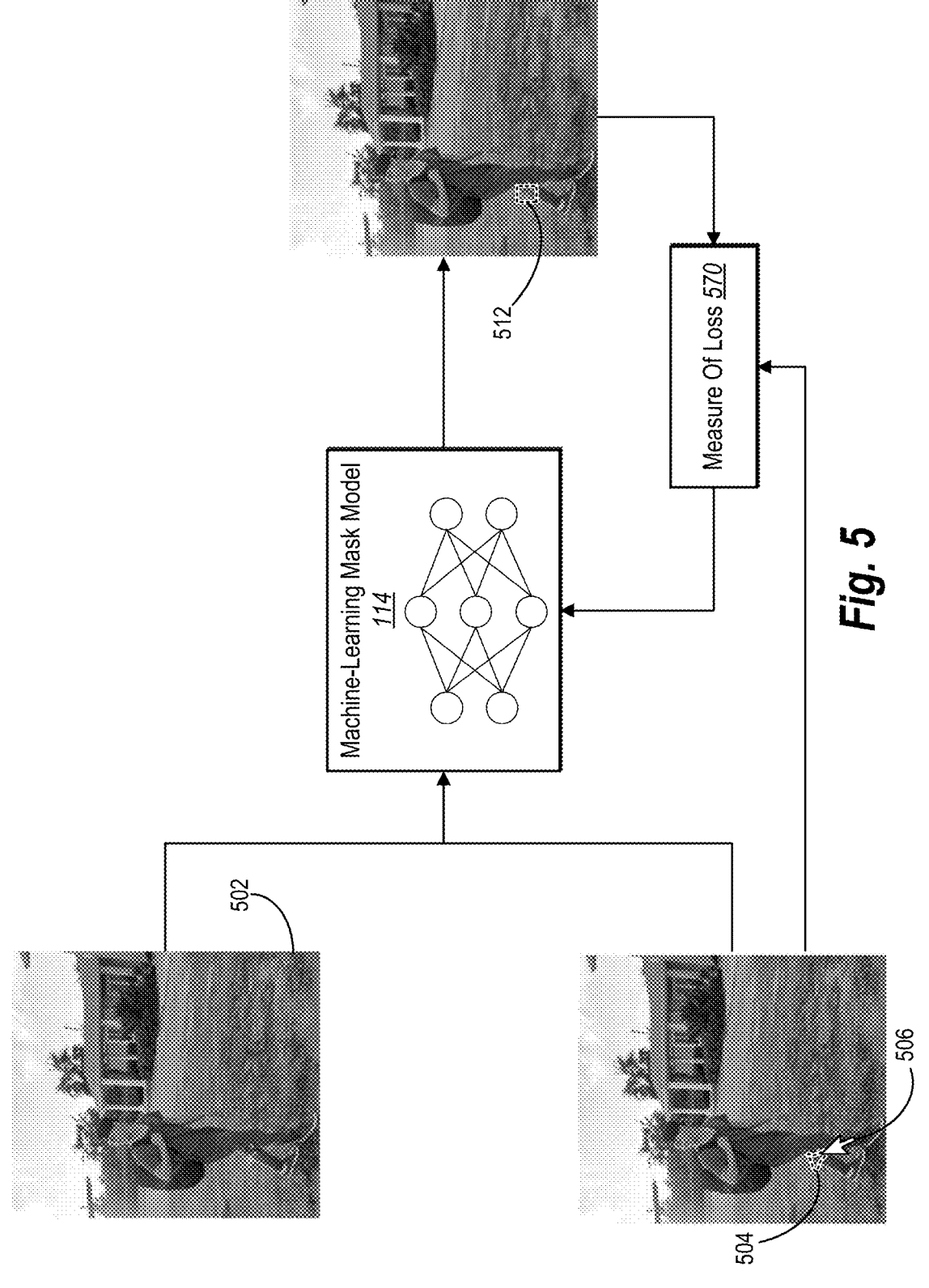
FIG. 5 illustrates a process for training a machine-learning mask model in accordance with one or more embodiments.

As discussed, the distractor segmentation system 102 can train the machine-learning mask model 114. For instance, FIG. 5 illustrates the distractor segmentation system 102 generating a mask for a distractor object in a digital image and comparing the mask with a ground truth mask to determine a measure of loss in accordance with one or more embodiments. Specifically, FIG. 5 shows the distractor segmentation system 102 obtaining a training image 502 and a ground truth mask 504 for an object portrayed in the training image 502. The distractor segmentation system 102 receives a selection input 506 by generating a simulated selection input based on the center of the object portrayed in the training image 502, for example, utilizing the techniques described above for FIG. 4. In some embodiments, the distractor segmentation system 102 receives selection inputs from client devices of users. Then, based on the selection input 506, the distractor segmentation system 102 utilizes the machine-learning mask model 114 to generate a segmentation mask 512 for the object, for example, utilizing the techniques described above for FIGS. 2 and 3.

Upon generating the segmentation mask 512, the distractor segmentation system 102 compares the segmentation mask 512 with the ground truth mask 504 to determine a measure of loss 570. The distractor segmentation system 102 can utilize a variety of loss functions to determine the measure of loss 570. For instance, the distractor segmentation system 102 calculates the measure of loss 570 according to a detection loss as described by Zhi Tian, Chunhua Shen, Hao Chen, and Tong He, Fcos: Fully convolutional one-stage object detection, In Proceedings of the IEEE/CVF international conference on computer vision, pages 9627-9636, 2019. In some embodiments, the distractor segmentation system 102 also utilize detection loss and/or DICE loss, as described by Open-world entity segmentation (incorporated by reference above). The distractor segmentation system 102 can also utilize a variety of other loss functions, such as mean absolute error loss (L1), quadratic loss (L2), cross entropy loss, and Kullback-Leibler loss. The distractor segmentation system 102 trains the machine-learning mask model 114 by modifying parameters of the machine-learning mask model 114 based on the measure of loss 570.

Although not illustrated in FIG. 5, the distractor segmentation system 102 can utilize a similar approach to train an object detection model (e.g., the object detection model 116). For example, the distractor segmentation system 102 can utilize ground truth bounding boxes (or other shapes) to teach the object detection model 116 to generate proposals for consideration by the machine-learning mask model 114. Indeed, in some implementations the distractor segmentation system 102 utilizes a similar architecture for the object detection model 116 as the machine-learning mask model.

Figure 6:
FIG. 6 illustrates an example output of a conventional segmentation system and an example output of the distractor segmentation system in accordance with one or more embodiments.

As discussed above, the distractor segmentation system 102 can flexibly and accurately generate masks for distractor objects. For instance, FIG. 6 illustrates the distractor segmentation system 102 generating an accurate mask for a distractor object based on a single click over the object, in accordance with one or more embodiments. More particularly, FIG. 6 shows a contrast between a segmentation mask generated by a conventional segmentation system (in the center of FIG. 6) and a segmentation mask generated by the distractor segmentation system 102 (on the right of FIG. 6). Specifically, FIG. 6 illustrates a digital image 602 depicting a vehicle on a road. A cursor represents a selection input 604 (e.g., a click position) over a distractor object (e.g., a small puddle on the road). The conventional segmentation system generated a segmentation mask 610 that covers the entire road. The segmentation mask 610 is overbroad, and does not correctly capture an intent for the selection input 604 to indicate a small distractor object in the digital image 602. By contrast, the distractor segmentation system 102 generated a segmentation mask 620 that covers the distractor object, without being overbroad. As can be seen in FIG. 6, the segmentation mask 620 fully covers the small puddle, without covering a large portion of the road beyond the small puddle. Thus, the distractor segmentation system 102 can improve upon conventional systems by more accurately segmenting distractor objects, while also enhancing flexibility by performing the segmentation based on a single click.

Figure 7:
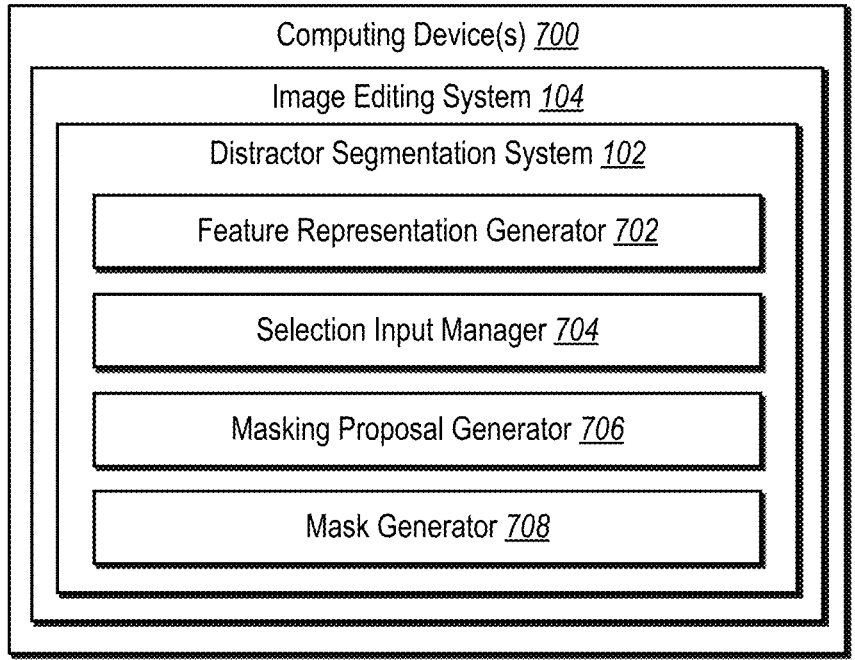
FIG. 7 illustrates a schematic diagram of an example architecture of a distractor segmentation system in accordance with one or more embodiments.

Turning now to FIG. 7, additional detail will be provided regarding components and capabilities of one or more embodiments of the distractor segmentation system 102. In particular, FIG. 7 illustrates an example distractor segmentation system 102 executed by a computing device(s) 700 (e.g., the server device(s) 106 or the client device 108). As shown by the embodiment of FIG. 7, the computing device (s) 700 includes or hosts the image editing system 104 and/or the distractor segmentation system 102. Furthermore, as shown in FIG. 7, the distractor segmentation system 102 includes a feature representation generator 702, a selection input manager 704, a masking proposal generator 706, and a mask generator 708.

As shown in FIG. 7, the distractor segmentation system 102 includes a feature representation generator 702. The feature representation generator 702 can generate an image feature representation from a digital image. Furthermore, the feature representation generator 702 can generate a modified feature representation by integrating a selection input into the image feature representation.

In addition, as shown in FIG. 7, the distractor segmentation system 102 includes a selection input manager 704. The selection input manager 704 can receive a selection input identifying one or more pixels corresponding to an object portrayed in the digital image.

Moreover, as shown in FIG. 7, the distractor segmentation system 102 includes a masking proposal generator 706. The masking proposal generator 706 can generate a plurality of masking proposals from the digital image based on the modified feature representation. For example, the masking proposal generator 706 can generate the plurality of masking proposals for the object portrayed in the digital image from the modified feature representation.

Furthermore, as shown in FIG. 7, the distractor segmentation system 102 includes a mask generator 708. The mask generator 708 can generate a mask for the object portrayed in the digital image from the modified feature representation.

Although not illustrated, the distractor segmentation system 102 can also include a storage manager. For example, the storage manager can be implemented by a memory component/device and store information on behalf of the distractor segmentation system 102. For example, the storage manager can include digital images, feature representations of digital images, encodings of selection input, segmentations, and/or modified digital images.

Each of the components 702-708 of the distractor segmentation system 102 can include software, hardware, or both. For example, the components 702-708 can include one or more instructions stored on a computer-readable storage medium and executable by processors of one or more computing devices, such as a client device or server device. When executed by the one or more processors, the computer-executable instructions of the distractor segmentation system 102 can cause the computing device(s) to perform the methods described herein. Alternatively, the components 702-708 can include hardware, such as a special purpose processing device to perform a certain function or group of functions. Alternatively, the components 702-708 of the distractor segmentation system 102 can include a combination of computer-executable instructions and hardware.

Furthermore, the components 702-708 of the distractor segmentation system 102 may, for example, be implemented as one or more operating systems, as one or more standalone applications, as one or more modules of an application, as one or more plug-ins, as one or more library functions or functions that may be called by other applications, and/or as a cloud-computing model. Thus, the components 702-708 may be implemented as a stand-alone application, such as a desktop or mobile application. Furthermore, the components 702-708 may be implemented as one or more web-based applications hosted on a remote server. The components 702-708 may also be implemented in a suite of mobile device applications or "apps." To illustrate, the components 702-708 may be implemented in an application, including but not limited to Adobe After Effects, Adobe Creative Cloud, Adobe Lightroom, Adobe Photoshop, Adobe Premiere, and Adobe Sensei. The foregoing are either registered trademarks or trademarks of Adobe in the United States and/or other countries.

FIGS. 1-7, the corresponding text, and the examples provide a number of different methods, systems, devices, and non-transitory computer-readable media of the distractor segmentation system 102. In addition to the foregoing, one or more embodiments can also be described in terms of flowcharts comprising acts for accomplishing a particular result, as shown in FIG. 8. FIG. 8 may be performed with more or fewer acts. Further, the acts may be performed in differing orders. Additionally, the acts described herein may be repeated or performed in parallel with one another or parallel with different instances of the same or similar acts.

As mentioned, FIG. 8 illustrates a flowchart of a series of acts 800 for generating segmentation masks in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8.

As shown in FIG. 8, the series of acts 800 includes an act 802 of generating an image feature representation from a digital image, an act 804 of receiving a selection input identifying a pixel corresponding to an object portrayed in the digital image, an act 806 of generating a modified feature representation by integrating the selection input into the image feature representation, and an act 808 of generating a mask for the object portrayed in the digital image from the modified feature representation.

In particular, the act 802 can include generating, utilizing a feature extraction model, an image feature representation from a digital image, the act 804 can include receiving a selection input identifying one or more pixels corresponding to an object portrayed in the digital image, the act 806 can include generating a modified feature representation by integrating the selection input into the image feature representation, and the act 808 can include generating, utilizing a machine-learning mask model, a mask for the object portrayed in the digital image from the modified feature representation. Alternatively, the act 806 can include generating a modified feature representation by integrating a selection input corresponding to an object portrayed in the digital image into the image feature representation. The act 808 can include generating, utilizing an object detection model, a plurality of masking proposals for the object portrayed in the digital image from the modified feature representation; and generating, utilizing a machine-learning mask model, a mask for the object portrayed in the digital image from the modified feature representation and the plurality of masking proposals.

For example, in one or more embodiments, the series of acts 800 includes wherein integrating the selection input into the image feature representation comprises: generating an interaction map from the selection input; and combining the interaction map and the image feature representation to generate the modified feature representation. Additionally, the series of acts 800 can include wherein receiving the selection input comprises receiving, via a user interface of a client device, a scribble input comprising a locus of pixels, and wherein integrating the selection input into the image feature representation comprises generating the interaction map from the locus of pixels. In some implementations, the series of acts 800 includes wherein integrating the selection input into the image feature representation comprises: generating an interaction map from the selection input, wherein the interaction map comprises an encoded pixel location corresponding to the selection input; and combining the interaction map and the image feature representation to generate the modified feature representation. In some embodiments, the series of acts 800 includes wherein integrating the selection input into the image feature representation comprises: generating an interaction map from a locus of pixels of the selection input; and combining the interaction map and the image feature representation to generate the modified feature representation.

Moreover, in one or more embodiments, the series of acts 800 includes receiving an additional selection input identifying an additional one or more pixels corresponding to the object portrayed in the digital image; and generating an additional modified feature representation by integrating the selection input and the additional selection input into the image feature representation. Additionally, the series of acts 800 can include generating, utilizing the machine-learning mask model, a refined mask for the object portrayed in the digital image from the additional modified feature representation. In some implementations, the series of acts 800 includes generating an additional modified feature representation by integrating the selection input and an additional selection input corresponding to the object portrayed in the digital image into the image feature representation; and generating, utilizing the machine-learning mask model, a refined mask for the object portrayed in the digital image from the additional modified feature representation. In some embodiments, the series of acts 800 includes receiving an additional selection input identifying an additional one or more pixels corresponding to the object portrayed in the digital image; generating an additional modified feature representation by integrating the selection input and the additional selection input into the image feature representation; and generating, utilizing the machine-learning mask model, a refined mask for the object portrayed in the digital image from the additional modified feature representation.

In addition, in one or more embodiments, the series of acts 800 includes wherein generating the image feature representation comprises: generating, utilizing the feature extraction model, a first image feature representation at a first resolution; and generating a second image feature representation at a second resolution different from the first resolution. Additionally, the series of acts 800 can include wherein generating the modified feature representation comprises: generating a first interaction map at the first resolution from the selection input; generating a second interaction map at the second resolution from the selection input; and combining the first interaction map with the first image feature representation and the second interaction map with the second image feature representation. In some implementations, the series of acts 800 includes wherein generating the modified feature representation comprises: generating a first interaction map from the selection input; generating a second interaction map from the selection input, the second interaction map having a resolution different from the first interaction map; and combining the first interaction map and the second interaction map with the image feature representation. In some embodiments, the series of acts 800 includes wherein generating the image feature representation comprises: generating, utilizing the feature extraction model, a first image feature representation at a first resolution and a second image feature representation at a second resolution different from the first resolution; and generating a first interaction map at the first resolution from the selection input and a second interaction map at the second resolution from the selection input.

Furthermore, in one or more embodiments, the series of acts 800 includes wherein generating the mask comprises: generating, utilizing an object detection model, a plurality of masking proposals from the digital image based on the modified feature representation; identifying a subset of masking proposals by filtering the plurality of masking proposals based on the selection input; and generating the mask based on the subset of masking proposals. Additionally, the series of acts 800 can include wherein generating the mask based on the subset of masking proposals comprises: generating, utilizing the machine-learning mask model, a plurality of masks and a plurality of confidence scores for the object portrayed in the digital image from the modified feature representation and the subset of masking proposals; and selecting the mask from the plurality of masks based on the plurality of confidence scores. In some implementations, the series of acts 800 includes wherein generating the mask for the object portrayed in the digital image comprises: identifying a subset of masking proposals by filtering the plurality of masking proposals based on the selection input; generating, utilizing the machine-learning mask model, a plurality of masks and a plurality of confidence scores for the object portrayed in the digital image from the modified feature representation and the subset of masking proposals; and selecting the mask from the plurality of masks based on the plurality of confidence scores. In some embodiments, the series of acts 800 includes wherein generating the mask comprises: generating, utilizing an object detection model, a plurality of masking proposals from the digital image based on the modified feature representation; identifying a subset of masking proposals by filtering the plurality of masking proposals based on the selection input; generating, utilizing the machine-learning mask model, a plurality of masks and a plurality of confidence scores for the object portrayed in the digital image from the modified feature representation and the subset of masking proposals; and selecting the mask from the plurality of masks based on the plurality of confidence scores.

In addition, in one or more embodiments, the series of acts 800 includes training the machine-learning mask model by: determining a center of the object portrayed in the digital image; receiving the selection input by generating a simulated selection input based on the center of the object portrayed in the digital image; and modifying parameters of the machine-learning mask model based on comparing the mask for the object portrayed in the digital image with a ground truth mask for the object portrayed in the digital image.

Embodiments of the present disclosure may comprise or utilize a special purpose or general purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions from a non-transitory computer-readable medium (e.g., memory) and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general purpose computer, special purpose computer, or special purpose processing device to perform a certain function or group of functions. In some embodiments, computer-executable instructions are executed by a general purpose computer to turn the general purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), a web service, Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 9:
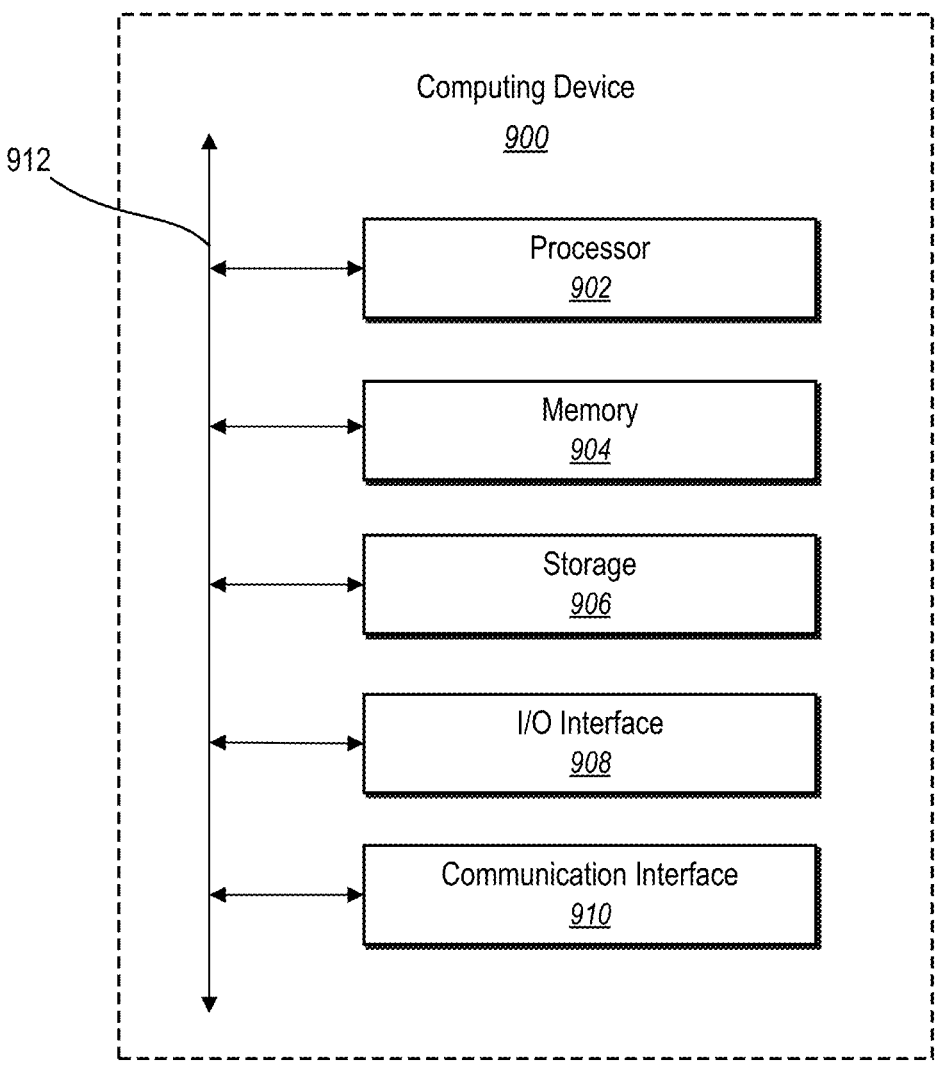
FIG. 9 illustrates a block diagram of an example computing device for implementing one or more embodiments of the present disclosure.

FIG. 9 illustrates a block diagram of an example computing device 900 that may be configured to perform one or more of the processes described above. One will appreciate that one or more computing devices, such as the computing device 900 may represent the computing devices described above (e.g., the computing device(s) 700, the server device(s) 106, or the client device 108). In one or more embodiments, the computing device 900 may be a mobile device (e.g., a mobile telephone, a smartphone, a PDA, a tablet, a laptop, a camera, a tracker, a watch, a wearable device, etc.). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes the memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes the storage device 906 for storing data or instructions. As an example, and not by way of limitation, the storage device 906 can include a non-transitory storage medium described above. The storage device 906 may include a hard disk drive ("HDD"), flash memory, a Universal Serial Bus ("USB") drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller ("NIC") or network adapter for communicating with an Ethernet or other wire-based network or a wireless NIC ("WNIC") or wireless adapter for communicating with a wireless network, such as a WI-FI. The computing device 900 can further include the bus 912. The bus 912 can include hardware, software, or both that connects components of computing device 900 to each other.

The use in the foregoing description and in the appended claims of the terms "first," "second," "third," etc., is not necessarily to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget, and not necessarily to connote that the second widget has two sides.

In the foregoing description, the invention has been described with reference to specific exemplary embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with fewer or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   generating, utilizing a feature extraction model, an image feature representation by encoding feature information from a digital image at a plurality of resolutions to generate a feature vector representation;
   receiving, via a graphical user interface of a client device, a selection input identifying a position of one or more pixels corresponding to an object portrayed in the digital image;
   generating, utilizing a click integration model, a modified feature representation by integrating an encoded spatial location for the selection input into the image feature representation;
   generating, utilizing an object detection model, a plurality of masking proposals from the digital image based on the modified feature representation; and
   generating, utilizing a machine-learning mask model and based on the plurality of masking proposals, a mask for the object portrayed in the digital image from the modified feature representation and the digital image.

2. The computer-implemented method of claim 1, wherein integrating the selection input into the image feature representation comprises:
   generating an interaction map from the selection input; and
   combining the interaction map and the image feature representation to generate the modified feature representation.

3. The computer-implemented method of claim 2, wherein receiving the selection input comprises receiving, via a user interface of a client device, a scribble input comprising a locus of pixels, and wherein integrating the selection input into the image feature representation comprises generating the interaction map from the locus of pixels.

4. The computer-implemented method of claim 1, further comprising:

receiving an additional selection input identifying an additional one or more pixels corresponding to the object portrayed in the digital image; and generating an additional modified feature representation by integrating the selection input and the additional selection input into the image feature representation.

5. The computer-implemented method of claim 4, further comprising:

generating, utilizing the machine-learning mask model, a refined mask for the object portrayed in the digital image from the additional modified feature representation.

6. The computer-implemented method of claim 1, wherein generating the image feature representation comprises:

generating, utilizing the feature extraction model, a first image feature representation at a first resolution; and generating a second image feature representation at a second resolution different from the first resolution.

7. The computer-implemented method of claim 6, wherein generating the modified feature representation comprises:

generating a first interaction map at the first resolution from the selection input;

generating a second interaction map at the second resolution from the selection input; and combining the first interaction map with the first image feature representation and the second interaction map with the second image feature representation.

8. The computer-implemented method of claim 1, wherein generating the mask comprises:

generating, utilizing an object detection model, a plurality of masking proposals from the digital image based on the modified feature representation;

identifying a subset of masking proposals by filtering the plurality of masking proposals based on the selection input; and generating the mask based on the subset of masking proposals.

9. The computer-implemented method of claim 8, wherein generating the mask based on the subset of masking proposals comprises:

generating, utilizing the machine-learning mask model, a plurality of masks and a plurality of confidence scores for the object portrayed in the digital image from the modified feature representation and the subset of masking proposals; and selecting the mask from the plurality of masks based on the plurality of confidence scores.

10. A system comprising:

one or more memory devices; and one or more processors coupled to the one or more memory devices that cause the system to perform operations comprising:

generating, utilizing a feature extraction model, an image feature representation by encoding feature information from a digital image at a plurality of resolutions to generate a feature representation;

generating, utilizing a click integration model, a modified feature representation by integrating an encoded spatial location for a selection input, received via a user interface of a client device, corresponding to an object portrayed in the digital image into the image feature representation;

generating, utilizing an object detection model, a plurality of masking proposals for the object portrayed in the digital image from the modified feature representation; and generating, utilizing a machine-learning mask model, a mask for the object portrayed in the digital image from the modified feature representation, the digital image, and the plurality of masking proposals.

11. The system of claim 10, wherein integrating the selection input into the image feature representation comprises:

generating an interaction map from the selection input, wherein the interaction map comprises an encoded pixel location corresponding to the selection input; and combining the interaction map and the image feature representation to generate the modified feature representation.

12. The system of claim 10, wherein the operations further comprise:

generating an additional modified feature representation by integrating the selection input and an additional selection input corresponding to the object portrayed in the digital image into the image feature representation; and generating, utilizing the machine-learning mask model, a refined mask for the object portrayed in the digital image from the additional modified feature representation.

13. The system of claim 10, wherein generating the modified feature representation comprises:

generating a first interaction map from the selection input;

generating a second interaction map from the selection input, the second interaction map having a resolution different from the first interaction map; and combining the first interaction map and the second interaction map with the image feature representation.

14. The system of claim 10, wherein generating the mask for the object portrayed in the digital image comprises:

identifying a subset of masking proposals by filtering the plurality of masking proposals based on the selection input;

generating, utilizing the machine-learning mask model, a plurality of masks and a plurality of confidence scores for the object portrayed in the digital image from the modified feature representation and the subset of masking proposals; and selecting the mask from the plurality of masks based on the plurality of confidence scores.

15. The system of claim 10, wherein the operations further comprise training the machine-learning mask model by:

determining a center of the object portrayed in the digital image;

receiving the selection input by generating a simulated selection input based on the center of the object portrayed in the digital image; and modifying parameters of the machine-learning mask model based on comparing the mask for the object portrayed in the digital image with a ground truth mask for the object portrayed in the digital image.

16. A non-transitory computer-readable medium storing instructions thereon that, when executed by at least one processor, cause the at least one processor to perform operations comprising:

generating, utilizing a feature extraction model, an image feature representation by encoding feature information from a digital image at a plurality of resolutions to generate a feature vector representation;

receiving, via a graphical user interface of a client device, a selection input identifying a position of one or more pixels corresponding to an object portrayed in the digital image;

generating, utilizing a click integration model, a modified feature representation by integrating an encoded spatial location for the selection input into the image feature representation;

generating, utilizing an object detection model, a plurality of masking proposals from the digital image based on the modified feature representation; and generating, utilizing a machine-learning mask model and based on the plurality of masking proposals, a mask for the object portrayed in the digital image from the modified feature representation and the digital image.

17. The non-transitory computer-readable medium of claim 16, wherein integrating the selection input into the image feature representation comprises:

generating an interaction map from a locus of pixels of the selection input; and combining the interaction map and the image feature representation to generate the modified feature representation.

18. The non-transitory computer-readable medium of claim 16, wherein the operations further comprise:

receiving an additional selection input identifying an additional one or more pixels corresponding to the object portrayed in the digital image;

generating an additional modified feature representation by integrating the selection input and the additional selection input into the image feature representation; and generating, utilizing the machine-learning mask model, a refined mask for the object portrayed in the digital image from the additional modified feature representation.

19. The non-transitory computer-readable medium of claim 16, wherein generating the image feature representation comprises:

generating, utilizing the feature extraction model, a first image feature representation at a first resolution and a second image feature representation at a second resolution different from the first resolution; and generating a first interaction map at the first resolution from the selection input and a second interaction map at the second resolution from the selection input.

20. The non-transitory computer-readable medium of claim 16, wherein generating the mask comprises:

generating, utilizing an object detection model, a plurality of masking proposals from the digital image based on the modified feature representation;

identifying a subset of masking proposals by filtering the plurality of masking proposals based on the selection input;

generating, utilizing the machine-learning mask model, a plurality of masks and a plurality of confidence scores for the object portrayed in the digital image from the modified feature representation and the subset of masking proposals; and selecting the mask from the plurality of masks based on the plurality of confidence scores.

* * * * *